Figure 1:
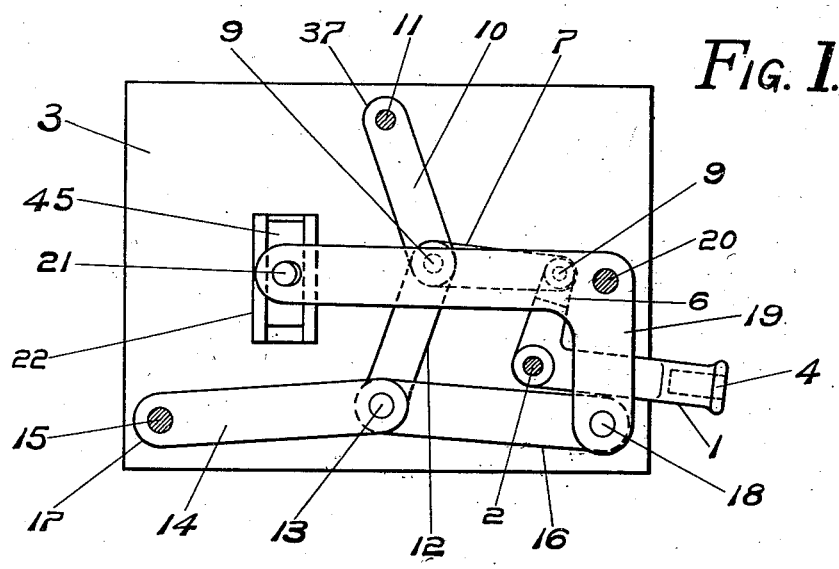

June 17, 1924.

C. H. HOWLAND-SHEARMAN

MECHANICAL MOTION

Filed Oct. 21, 1920     3 Sheets—Sheet 1

1,498,099

WITNESS:
Geo. E. Gabel.
A. B. Vliet.

INVENTOR.
Charles H. Howland-Shearman
BY
ATTORNEY.

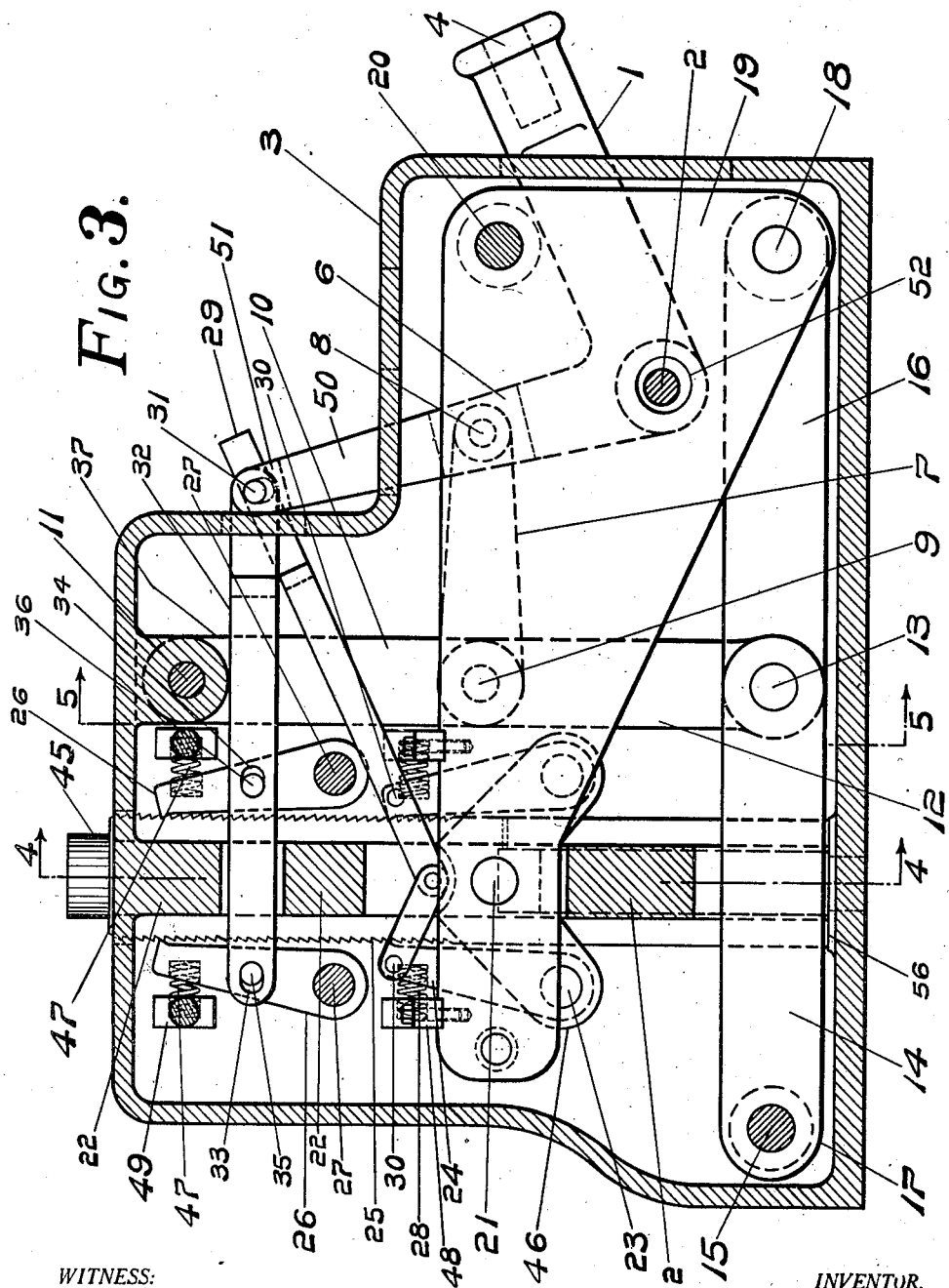

June 17, 1924.
C. H. HOWLAND-SHEARMAN
MECHANICAL MOTION
Filed Oct. 21, 1920
1,498,099
3 Sheets—Sheet 3
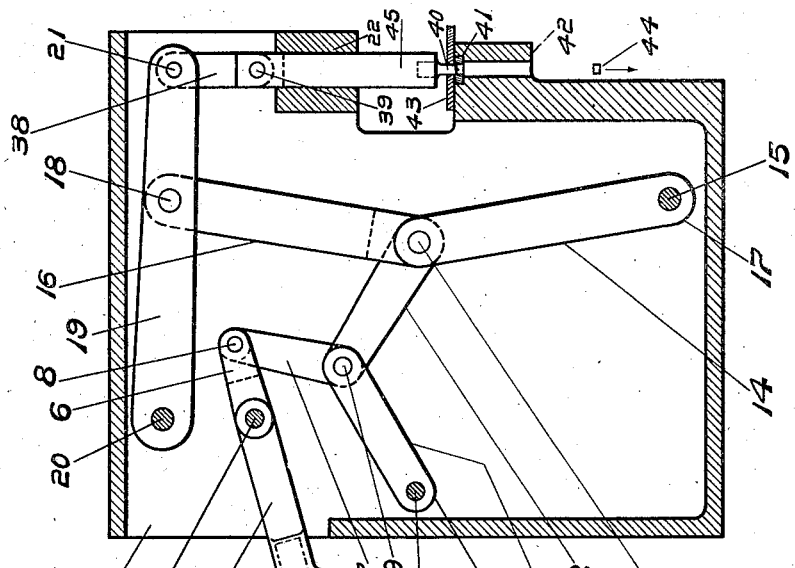
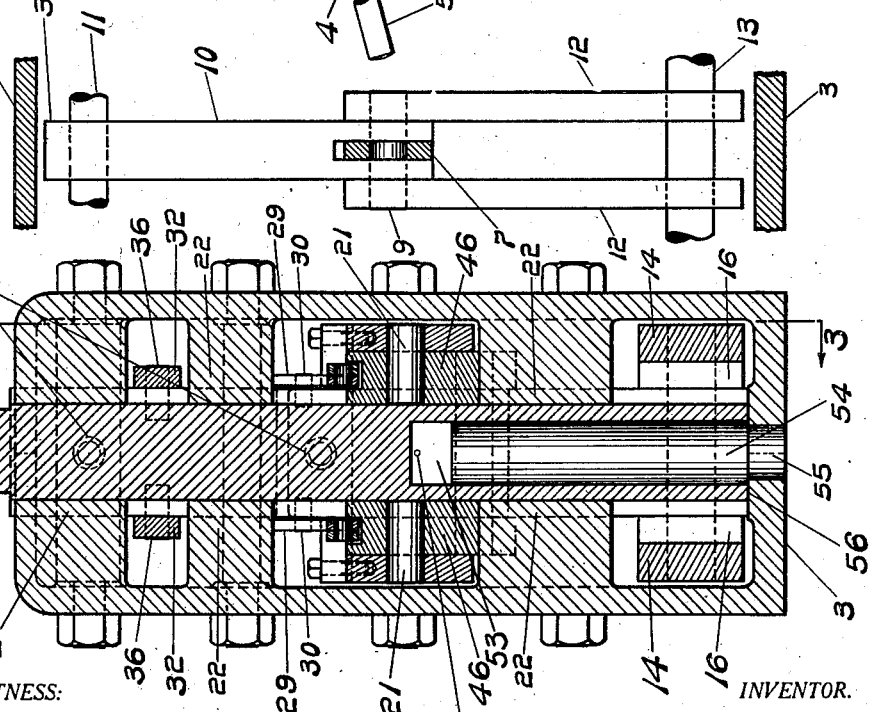
WITNESS:
Geo. C. Gabel.
A. B. Vliet.
INVENTOR.
Charles H. Howland-Shearman.
BY
Eu. Bedford
ATTORNEY.

Patented June 17, 1924.

1,498,099

UNITED STATES PATENT OFFICE.

CHARLES H. HOWLAND-SHEARMAN, OF INDIANAPOLIS, INDIANA.

MECHANICAL MOTION.

Application filed October 21, 1920. Serial No. 418,455.

*To all whom it may concern:*

Be it known that I, CHARLES H. HOWLAND-SHEARMAN, a citizen of the United States, residing at Indianapolis, in the county of Marion and State of Indiana, have invented certain new and useful Improvements in Mechanical Motions, of which the following is a specification.

The objects of my invention are as follows: First, to supply a mechanical motion of simple linkage construction adapted to deliver a very great pressure through a relatively short distance, which motion shall be adaptable to use as a substitute for much more complicated and expensive mechanisms of gears, screws or cams, in the construction of various machinery, such as jacks, punches, presses, stump-pullers, etc.; second, to provide a mechanical motion of such construction, that it shall be adapted to deliver its highest pressure at the start of its actuation, and to gradually reduce that pressure during the delivery stroke of the motion, thus rendering my invention especially valuable for use in heavy punches and similar machines, where the resistance of the material cut is excessive at the beginning of the stroke, but is precipitately reduced as the stroke of the mechanism progresses; third, to furnish a generally adaptable pressure-intensifying mechanical motion of such simplicity of construction that it may be utilized in relatively small spaces, so as to accomplish an augmentation of pressure equal to that of the elaborate bulky mechanisms hitherto necessary, thus adapting my invention to use in constructions where the limitations of space would otherwise render its mechanical function unattainable.

I attain these objects by the employment of articulated tractor-levers, the effect of which is to deliver a powerful pulling effort like that of a funicular machine as distinctly opposed to the pushing effort of a press or toggle. The difference in the mechanical arrangement of the parts of my invention and those of a toggle is also fundamental. The toggle, as defined by mechanical authorities, comprises a joint formed of bars so hinged together that when at rest the two parts form a a bend called the knuckle, whereas my invention comprises a joint formed of bars so hinged together that when at rest the two parts form a straight line with their three articulating pins all centering in what is commonly known to engineers as "the infinite plane." The effect of this latter arrangement is to impart a theoretically infinite, and actually very great kinetic efficiency to my mechanical motion at its starting position, when beginning to pull its bars out of said infinite plane, by the application of power to its central knuckle-pin.

Figure 2:
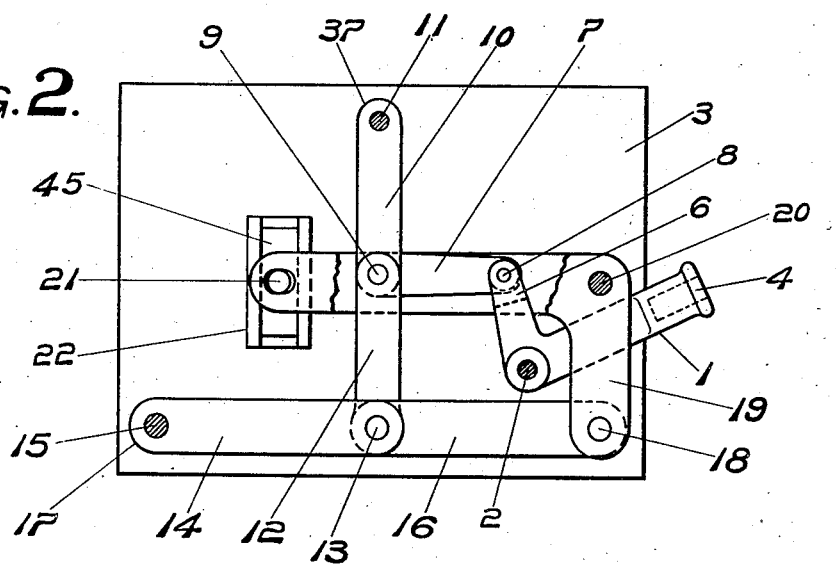

I accomplish the objects stated by means of the arrangement illustrated in the accompanying drawings, in which, Figure 1, is a side elevation of an example of my invention mounted upon a frame-plate and provided with a socket member, suited to the introduction of a handle for actuating the mechanical motion, the invention being shown with its parts in the position occupied upon the completion of a stroke; Fig. 2 is a side elevation of the same mechanism illustrated in Fig. 1, but showing the parts thereof in the positions occupied at the beginning of the stroke; Fig. 3 is an enlarged view of an example of my invention, illustrating the mode of its application to the construction of a high-power jack, taken as a longitudinal section on the line 3—3, Fig. 4, looking in the direction of the arrows, and showing particularly the method of attachment of the same mechanical motion illustrated in Figs. 1 and 2 to the ram of said jack for the actuation of the latter; Fig. 4 is a transverse section through the same jack, taken upon the line 4—4, of Fig. 3, looking in the direction of the arrows; Fig. 5 is a view taken partly in section on the line 5—5, Fig. 3, looking in the direction of the arrows, showing the vertical set of articulated tractor-levers used in my mechanical motion, as applied to said jack; and Fig. 6 is an illustration showing the method of incorporating my mechanical motion in the construction of a punch, for the purpose of producing the high intensification of pressure required for the punching of metals, the machine being shown with its parts in the position occupied at the end of the stroke just as a blank, which has been punched out of a plate lying upon the die-block, is seen dropping out of the latter.

Similar numerals refer to similar parts throughout the several views.

Referring to Figs. 1 and 2, 1 is the primary actuating member of my mechanical motion, journaled on the pivot 2, supported upon the frame-plate 3. Said actuating-member 1 may either be made bent as shown in Figs. 1, 2, and 3, or straight as shown in Fig. 6.

The inner end of the actuating member 1, is provided with a fork 6, which is adapted to receive the connecting-link 7, to which it is pivoted by the pin 8 in said fork. The opposite end of said connecting-link 7 is pivoted upon the knuckle-pin 9, forming the central articulation between the suspension-arm 10, journaled on the suspension-pin 11 fixed in the frame-plate 3, and the delivery-arm 12 of the low-pressure primary tractor-levers 37. Said delivery-arm 12 is preferably made duplex, as indicated in Fig. 5, and is commonly articulated near the extremity opposite to said knuckle-pin 13, forming the central articulation between the suspension arm 14, journaled on the secondary suspension-pin 15, and the delivery arm 16 of the high-pressure secondary tractor-levers 17. The extremity of said high-pressure secondary tractor-levers opposite to the suspension pin 15, is articulated by the delivery pin 18 to the delivery member 19, journaled on the fulcrum-pin 20 in the frame-plate 3. Said delivery member 19 is intended to deliver the extreme pressure from my mechanical motion to such remaining parts of the mechanism as are required to be actuated thereby, and it may be made either bent as shown in Figs. 1, 2, and 3, or straight as shown in Fig. 6. Said delivery member 19 is connected near its inner extremity by the pin 21 to any suitable form of ram or punch-block such as 45 in Figs. 1, 2, 3, and 6, for delivering power or actuating the tool which may be operated by any machine imbodying my mechanical motion. Said ram 45 preferably slides in a guide 22, as shown in Figs. 2 and 6, and when my motion is used to actuate such a tool as a jack, as shown in Fig. 3, the pressure from the pin 21 may be transmitted through a yoke as 46 having journaled therein duplex ratchet pins 23 mounting duplex lifting-pawls 24 adapted to engage duplex ratchets 25 made on the face of said ram 45. The motion communicated to said ram may be incrementally locked during the progress thereof by duplex fixed locking-pawls 26, mounted on the fixed pins 27 secured in the frame-plate 3, all of said lifting and locking pawls being normally held in contact with the ratchets 25 by any suitable springs as 28 and 47, respectively socketed in lugs as 48 and 49 as shown in Fig. 3.

In the case of a jack, there may also be provided a manually operable toggle detaching-device as 29, journaled on pivots 30 in the lifting-pawls 24, by the straightening of which said pawls may be withdrawn from contact with the ratchets 25 and locked out of engagement; and the top of the fork 6 of the actuating member 1 may be closed like a slot and bear integrally the extension 50 provided with an auxiliary fork, as 51 engaging by a demountable pin as 31 a forked walking-link as 32, provided with slots 33, 34, adapted to alternately engage the pins 35, 36, of the duplex locking-pawls 26, so as to alternately first push the one, and then pull the other of said pawls of its engagement with the ratchets 25, in lowering a load which has been raised upon the ram 45 of such a jack. Clearance openings, as 52 Fig. 3, may be made through the duplex delivery member 19 to permit the positioning therethrough of the fixed fulcrum-pin 2, without motion interference therewith of said delivery member.

In using the invention for jacks, in order to neutralize shock in lowering a load on the ram 45, as indicated in Figs. 3 and 4, a dash-pot cavity 53 is bored in the lower half length-wise through said ram into which may be fitted an elongated dash-pot plunger as 54, having its shouldered reduction 55 firmly secured in the base-boss 56, upon which latter the telescoping ram is adapted to come to rest. An air-hole as 57, is provided in the dash-pot cavity 53 giving ingress and egress of the cushioning air to the atmosphere. It is obvious that numerous alternative arrangements may be substituted for the one indicated in Figs. 3 and 4, in the adaptation of my mechanical movement to a jack, but the one so indicated has been found exceptionally powerful. It is therefore presented as a desirable example.

When my mechanical motion is incorporated in the construction of a punch as indicated in Fig. 6, its mode of operation is in no essential sense different than when it is employed in a jack as indicated in Figs. 3, 4, and 5, except that in such adaptation it is found convenient to position horizontally the low-pressure primary tractor-levers 37 journaled on the primary suspension-pin 11 fixed in the frame-plate 3, and to position vertically the high-pressure secondary tractor levers 17, journaled on the secondary suspension-pin 15, in order to conveniently convert the stroke of the horizontal actuating member 1 into a vertical delivery stroke on the ram 45. In such an adaptation of my mechanical motion, the delivery member 19 pivoted upon the fixed pin 20 in said frame-plate 3 is made straight instead of bent as in the adaptations shown in Figs. 2 and 3, and is articulated by the delivery-pin 18, to the delivery arm 16 of the secondary tractor-levers 17. The extremity of said delivery member 19 opposite to the suspension pin 20, as shown in Fig. 6, may also be articulated by the pin 21 to a ram-link as 38, having its lower end joined by a pin as 39 to the ram 45 sliding in the guides 22. On said ram 45 may be carried any suitable tool as the punch 40 registering with the die 41 seated in the die-block 42 made in said frame-plate 3 so as to adapt said tool 40 to cut from any plate or material as 43, blanks such as 44 shown by the arrow to be dropping from said die-block 42.

It is clear that the arrangement of my mechanical motion in the construction of a punch is susceptible of wide variations from that shown in Fig. 6 without at all modifying its essential kinematics or dynamic utility, and that also it may be actuated by any suitable form of motor operating upon the actuating member 1 instead of by the handle 5 inserted in the socket 4 as shown in said illustration.

It is evident that my mechanical motion is adaptable to a wide variety of machines other than the jack and punch shown in the accompanying drawings as illustrations of its use, its peculiar action being such that it is capable of successful utilization in any mechanism where excessive pressure is required to be exerted in a small compass for a relatively short distance, or in machines where it is desired to avoid the excessive cost of the large screw, gear, or cam constructions which it would be necessary to employ in order to produce a pressure at equal speed to that obtainable from my invention.

The physical properties manifested in the operation of my mechanical motion are exactly the inverse of the properties manifested in the operation of a toggle. In the case of the latter the actuating power is applied to the toggle knuckle when it is at its farthest bent position and the mechanism develops its lowest kinetic efficiency at this starting position, and its highest kinetic efficiency at its completing position when the toggle has become substantially straightened. This renders a toggle essentially unadaptable to such work as punching, jacking, etc., where the greatest resistance is experienced at the start and the least at the finish of the stroke. It is true that toggles, though so manifestly unsuited for such utilization, have been extensively employed especially on punches, but such machines have depended upon flywheels for overcoming the inefficiency of the toggles. On the contrary, the arrangement of inter-articulated sets of tractor-levers employed in my mechanical motion is such that each set of tractor-levers develops its greatest kinetic efficiency in the straight-line starting position of its stroke and gradually reduces its kinetic efficiency as the tractor-levers bend in making their stroke. This quality especially adapts my mechanical motion to use in all machines where the extreme resistance is experienced at the beginning of the stroke and the minimum resistance is experienced at the end of the stroke as in punching; and enables tools in which my motion is incorporated to dispense with the fly-wheels hitherto used for overcoming the inefficiency of such mechanisms because of inversion of their mechanical advantage, or kinetic efficiency, as related to the time which the highest resistance from the material being worked is experienced in their operation, due to their dependence upon gears, toggles or similar devices for effecting the required delivery of pressure.

Having thus described my invention, I claim:

1. Combined in a mechanical motion, a frame; an actuating member pivotally supported upon said frame; a connecting member articulated to said actuating member; a primary set of tractor-levers pivotally suspended at its fixed end upon said frame, having the knuckle pin thereof commonly articulated to said connecting member at the end thereof opposite to its articulation to said actuating member; a secondary set of tractor-levers pivotally supported at the fixed end thereof upon said frame, having the intermediate knuckle thereof articulated commonly upon the end-pin of the movable end of said primary set of tractor-levers; and a delivery member pivotally supported upon said frame, and articulated to the delivery-pin of the movable end of said secondary set of tractor-levers and having the longer end thereof articulated to a slidable member on said frame for delivering the combined motive power of said mechanical motion substantially as described.

2. A mechanical motion comprising a pivoted actuating lever adapted to be moved through an arc, a tractor-lever operated thereby having one of its component links fixed, a second tractor-lever disposed at right angles to the first said tractor-lever and operated by the other of its said component links, said second tractor-lever having one of its component links fixed, a lever operated by the other said component link of the second tractor-lever and an actuated member adapted to be reciprocated by the last lever, substantially as set forth.

3. A mechanical motion comprising a pivoted actuating lever adapted to be moved through an arc, a tractor-lever operated thereby having one of its component links fixed, a second tractor-lever disposed at right angles to the first said tractor-lever and operated by the other of its said component links, said second tractor-lever having one of its component links fixed, a lever operated by the other said component link of the second tractor-lever and an actuated member adapted to be reciprocated by the last lever the greatest force being delivered to the actuated member at the beginning of the reciprocation, substantially as set forth.

4. A mechanical motion comprising an actuating lever, a tractor-lever operated thereby having one of its component links fixed, a second tractor-lever operated by the other component link of the first said tractor-lever, said second tractor-lever having one of its links fixed, a lever operated by the other link and an actuated member adapted to be reciprocated by the last lever, substantially as set forth.

In witness whereof, I have hereunto set my hand and seal at Indianapolis, Indiana, this 16th day of October, A. D. nineteen hundred and twenty.

CHARLES H. HOWLAND-SHEARMAN. [L. S.]

Witnesses:
CAREY S. FRYE,
M. L. SHULER.